United States Patent [19]
Koizumi et al.

[11] Patent Number: 6,052,424
[45] Date of Patent: Apr. 18, 2000

[54] METHOD OF WELDING FOR FABRICATING DOUBLE-WALL STRUCTURES

[75] Inventors: Koichi Koizumi; Masataka Nakahira; Yutaka Itou; Eisuke Tada, all of Ibaraki-ken, Japan

[73] Assignee: Japan Atomic Energy Research Institute, Tokyo, Japan

[21] Appl. No.: 09/041,672

[22] Filed: Mar. 13, 1998

[30] Foreign Application Priority Data

Mar. 18, 1997 [JP] Japan ................................. 9-064781

[51] Int. Cl.⁷ ............................. G21B 1/00; B23K 15/00; B23K 9/00
[52] U.S. Cl. ...................... 376/150; 376/260; 219/121.3; 219/121.14
[58] Field of Search .................... 376/150, 260, 376/463; 219/121.3, 121.14

[56] References Cited

FOREIGN PATENT DOCUMENTS

| 04118180 | 4/1992 | Japan | 219/121.13 |
|---|---|---|---|
| 06249980 | 9/1994 | Japan | 376/150 |
| 07318671 | 12/1995 | Japan | 376/150 |
| 08233966 | 9/1996 | Japan | 376/150 |
| 09049889 | 2/1997 | Japan | 376/150 |
| 09145871 | 6/1997 | Japan | 376/150 |

OTHER PUBLICATIONS

Ioki et al, Design of the ITER Vacuum Vessel, Fusion Engineering and Design, vol. 27, p. 39–51, 1995.
Koizumi et al, Fabrication of Double–walled Section Models of the ITER Vacuum Vessel, 16th IEEE/NPSS Symposium on Fusion Engineering, pp. 198–201, Sep. 1995.
Koizumi, et al., Development of Full–Scale Sector Model for Iter Vacumm Vessel, Fusion Technology, 1347–1350, 1996.

*Primary Examiner*—Charles T. Jordan
*Assistant Examiner*—Jack Keith
*Attorney, Agent, or Firm*—Banner & Witcoff, Ltd.

[57] ABSTRACT

A double-wall structure consisting of an inner wall, an outer wall surrounding said inner wall and reinforcing ribs that connect said outer and inner walls is produced by a piercing welding method in which an electron beam is externally applied at right angles to the outer wall, such that the welded structure of the outer wall and each rib is composed of at least two piercing weld beads that are spaced apart by an unwelded area, with the sum of the widths of the weld beads being at least 25% of the rib width and the length of the unwelded area exterior to the root of each bead being no more than 20% of plate thickness. The distortion in welding is sufficiently reduced to enable precise assembling of the double-wall structure that can be fabricated efficiently and which can reasonably withstand the large electromagnetic force caused by plasma disruption.

6 Claims, 7 Drawing Sheets

METHOD OF WELDING FOR FABRICATING DOUBLE-WALL STRUCTURES

BACKGROUND OF THE INVENTION

The present invention relates to a method of welding to fabricate double-wall structures composed of inner and outer wall and reinforcing ribs provided between the outer and inner walls. The invention also relates to a double-wall structure produced by the method. Double-wall structures that can be produced by the method include ship, airplane and car bodies, as well as bridge structures, various containers for use in industrial plants, and vacuum vessels.

The present invention relates particularly to a method of welding a vacuum vessel composed of a double-wall structure reinforced with ribs between the outer and inner walls. The invention also relates to a vacuum vessel produced by this welding method. The invention further relates to a method of welding a double-walled vacuum vessel for a nuclear fusion device which consists of an inner wall to be exposed to a plasma and an outer wall that surrounds it, with the walls being reinforced with ribs and welded to each other. The invention also relates to a vacuum vessel for a nuclear fusion device that is produced by this welding method.

An electron beam welding method is conventionally applied to fabricate double-wall structures such as ship, airplane and car bodies, as well as bridge structures and vacuum vesslels by welding the inner and outer walls together with reinforcing ribs.

In the class of nuclear fusion devices called "tokamak", a plasma created within a vacuum vessel is heated and sufficiently maintained with a strong external magnetic field to initiate a fusion reaction. The plasma-confining vacuum vessel is required to be capable of sustaining a high vacuum and function as a primary barrier against radiations. It is also required to withstand the large electromagnetic force produced by plasma disruption. In addition, in order to secure plasma control characteristics and reduce the loss of magnetic flux that occurs when a plasma is brought to energy break-even conditions, the electrical resistance of the vacuum vessel as measured in the toroidal direction of the torus must be held higher than a certain value. These requirements can be met by a vacuum vessel of double-wall structure that consists of an inner wall to be exposed to a plasma and an outer wall that surrounds it and in which the inner and outer walls are joined with ribs to segment the vessel wall in compartments. If the reinforcing ribs are arranged in a poloidal direction, only a small effect is caused on the electrical resistance of the vacuum vessel in the toroidal direction.

Figure 13:
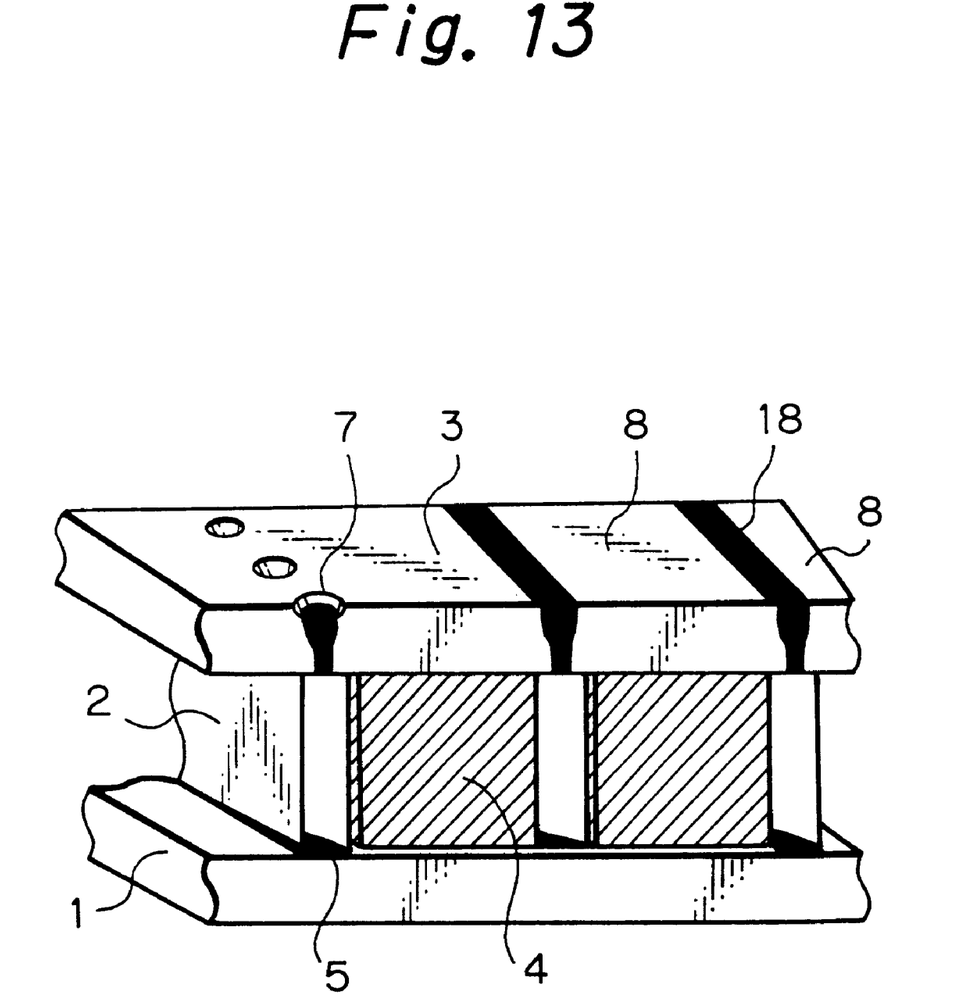
FIG. 13 is a partial perspective view of welds in a conventional double-wall structure.

An example of this type of vacuum vessel for use in fusion devices is described in Japanese Patent Public Disclosure No. 731919/1990. The double-wall structure adopted by such vacuum vessels has the additional advantage of securing mechanical strength and rigidity. On the other hand, extensive use of welding is required to fabricate this double-wall structure. In addition, the welding of the outer wall to ribs, which is performed after inserting a shield between adjacent ribs, can only be effected from outside. Conventionally, the outer wall is externally joined to ribs by plug welding which is illustrated in FIG. 13. However, it is difficult to secure the desired weld strength by this method. If slot welding is substituted with a view to increasing the throughput, the distortion in welding is also increased and, what is more, the man-hour required is exorbitant.

SUMMARY OF THE INVENTION

The present invention has been accomplished under these circumstances and has as an object providing a method of welding a double-wall structure such that even if its size is increased, the fabrication efficiency is not compromised and the distortion in welding is sufficiently reduced to enable precise assembling of a structure that can reasonably withstand the great electromagnetic force caused by plasma disruption.

Another object of the invention is to provide a double-wall structure that is produced by the method.

A particular object of the invention is to provide a double-walled vacuum vessel by the method that is suitable for use in a fusion device.

The first object of the invention can be attained by a piercing welding method for fabricating a double-wall structure consisting of an inner wall, an outer wall surrounding said inner wall and reinforcing ribs that connect said outer and inner walls, in which an electron beam is externally applied at right angles to the outer wall such that the applied electron beam penetrates the outer wall to reach the abutting rib, whereupon the outer wall is welded to the rib, characterized in that the welded structure of the outer wall and the rib is composed of at least two piercing weld beads that are spaced apart by an unwelded area, with the sum of the widths of the weld beads being at least 25% of the rib width and the length of the unwelded area exterior to the root of each bead being no more than 20% of plate thickness.

The second object of the invention can be attained by a double-wall structure consisting of an inner wall, an outer wall surrounding said inner wall and reinforcing ribs that connect said outer and inner walls, said structure being produced by a piercing welding method in which an electron beam is externally applied at right angles to the outer wall such that the applied electron beam penetrates the outer wall to reach the abutting rib, whereupon the outer wall is welded to the rib, characterized in that the welded structure of the outer wall and the rib is composed of at least two piercing weld beads that are spaced apart by an unwelded area, with the sum of the widths of the weld beads being at least 25% of the rib width and the length of the unwelded area exterior to the root of each bead being no more than 20% of plate thickness.

The particular object of the invention is attained by a double-walled vacuum vessel for a fusion device which is a torus-shaped plasma container consisting of an inner wall to be exposed to a plasma, an outer wall surrounding said inner wall and reinforcing ribs that connect said outer and inner walls, with shields being inserted between the two walls and the outer wall being combined with each rib to form a T shape, further characterized by being fabricated by a piercing welding method in which an electron beam is externally applied at right angles to the outer wall such that the applied electron beam penetrates the outer wall to reach the abutting rib, whereupon the outer wall is welded to the rib and that the welded structure of the outer wall and the rib is composed of at least two piercing weld beads that are spaced apart by an unwelded area, with the sum of the widths of the weld beads being at least 25% of the rib width and the length of the unwelded area exterior to the root of each bead being no more than 20% of plate thickness.

In a preferred embodiment, wraparound welding is applied to the piercing welded end of each rib such that the distortion in welding is sufficiently reduced to enable precise assembling of a structure that can reasonably withstand the large electromagnetic force caused by plasma disruption.

DETAILED DESCRIPTION OF THE INVENTION

The present invention will now be described in detail with particular reference to the case where it is implemented to fabricate a vacuum vessel for a nuclear fusion device.

Figure 1:
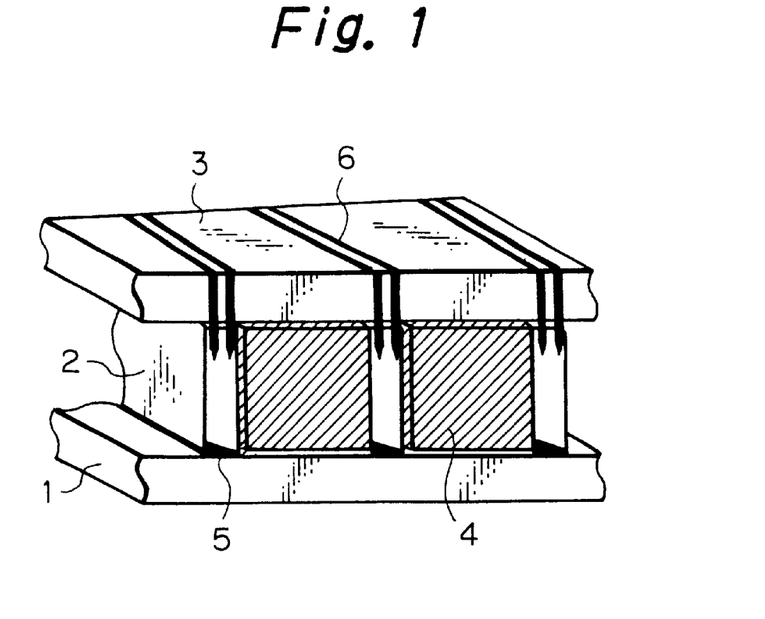
FIG. 1 is a partial perspective view showing the interior of a double-wall structure according to an embodiment of the invention.

FIG. 1 is a partial perspective view of a double-walled and ribbed vacuum vessel for a fusion device according to an embodiment of the invention. As shown, the vessel is composed of an inner wall 1 and connected via reinforcing ribs 2 to an outer wall 3. Both walls are made of a steel in the shape of a container.

Figure 2:
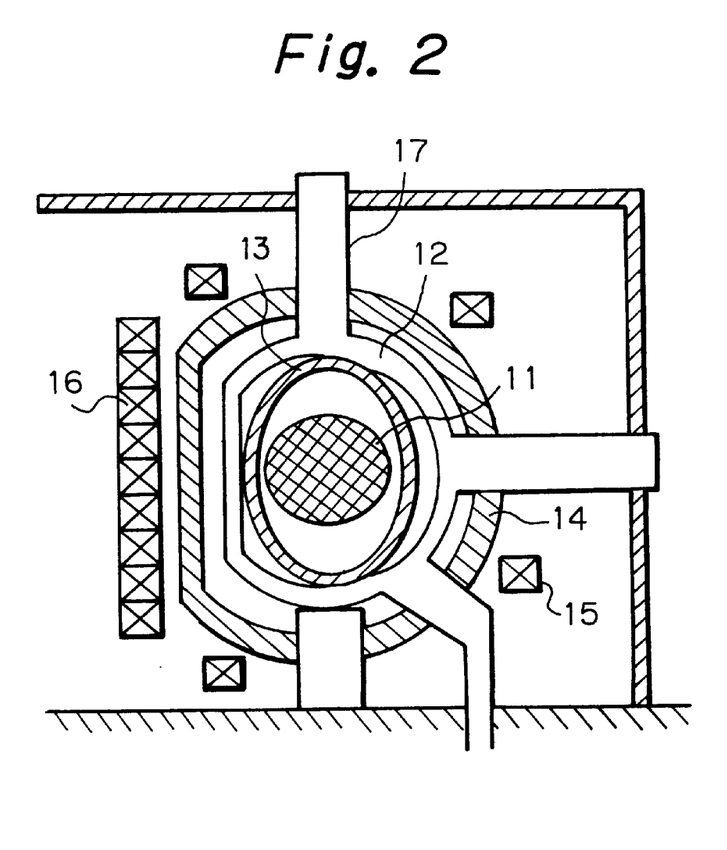
FIG. 2 is a cross-sectional view showing diagrammatically a fusion device.

The vacuum vessel is to be placed in a tokamak fusion device. As shown in FIG. 2, a tokamak comprises essentially a torus-shaped vacuum vessel 12 which is to contain a plasma 11 and maintain a high vacuum, machinery 13 placed within the vacuum vessel 12 to surround the plasma 11, toroidal field coils 14 wrapped around the minor diameter of the torus, poloidal field coils 15 placed concentric with the vacuum vessel 12, and central solenoid coils 16 placed in a face-to-face relationship with the front of the vacuum vessel 12. The vacuum vessel 12 is also equipped with ports for assisting in maintenance and other operations.

Figure 3:
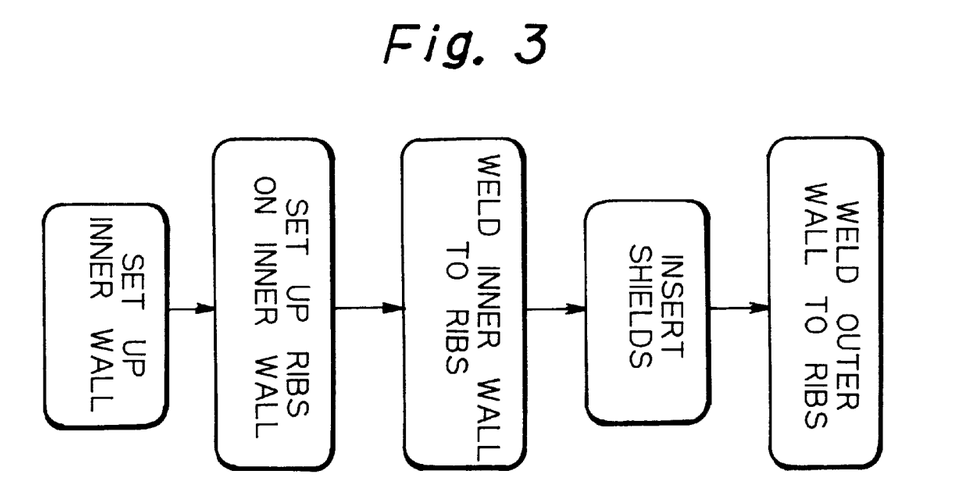
FIG. 3 is a flowchart for the fabrication procedure of a double-wall structure.

The sequence of assembling the vacuum vessel 12 is shown in FIG. 3. First, the inner wall 1 and ribs 2 are set up in T shapes and welded at sites 5 as shown in FIG. 1. Then, a shield 4 is inserted between adjacent ribs to fill the gap. In the last step, the outer wall 3 is placed over the ribs and an electron beam is externally applied at right angles to the outer wall such that the applied beam penetrates the outer wall to reach the abutting rib 2, thereby producing a piercing weld 6.

Welding at sites 5 is performed before inserting the shields 4, so it can be effected internally by various welding techniques such as arc welding, electron beam welding and laser beam welding. On the other hand, piercing welding of the outer wall 3 to the ribs 2 is performed at sites 6 after inserting the shields, so external welding methods must be employed. In order to perform arc welding externally, it has been necessary to make holes in the outer wall as indicated by 7 in FIG. 13, through which multi-layer welding is effected. Called "plug welding", this technique requires a huge amount of mechanical work and an extensive welding time; in addition, it is practically impossible to reduce the distortion in welding. Electron beam welding involves fusing of the base metal and can hence penetrate a steel plate about 100 mm thick. The outer wall 3 can be welded to a rib 2 in one step and In the absence of the need to make through-holes as shown in FIG. 13, the amount of mechanical work that must be done is negligible. In addition, the strength of the joint between the outer wall and ribs can be increased by performing continuos welding as shown in FIG. 1.

If one wants to obtain the same result by applying arc welding externally, he must first divide the outer wall 3 into short strips 8 as shown in FIG. 13 and then weld the ribs 2 to the strips and connect the strips together by butt or slot welding along lines 18. In this case, too, extensive time is taken to prepare the strips 8; in addition, the plates to be welded have to be clamped in a fixture, vice or jig in order to minimize the distortion in welding. If distortion occurs, the resulting mismatch between the ribs and the strips 8 and between the strips themselves has to be corrected, again taking considerable time. Electron beam welding permits continuous operations by merely moving an electron beam across the width of each strip and even in the fabrication of a large container, each welding site can be welded by one pass, contributing to a marked improvement in the operating efficiency.

Figure 4:
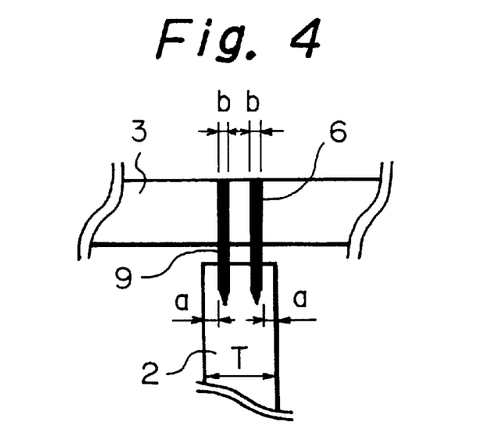
FIG. 4 is a cross-sectional view of a joint of the outer wall and each rib in the double-wall structure of the invention.
Figure 6:
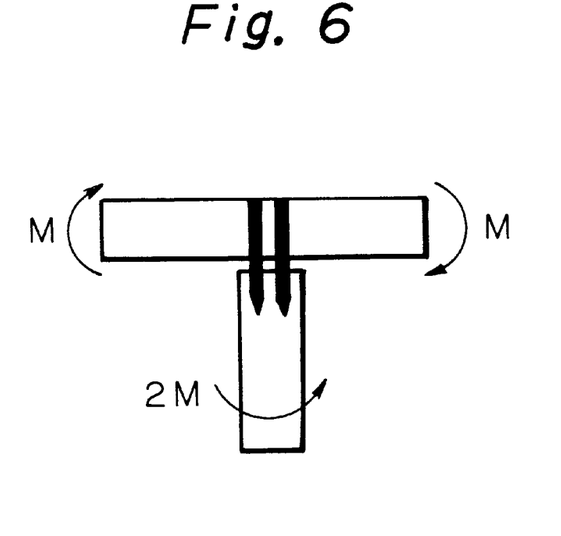
FIG. 6 is a cross-sectional view showing the stresses that are produced by an electromagnetic force applied to a joint in a double-wall structure.

To make the welded joints of the outer wall and ribs shown in FIG. 1, at least two spaced weld beads are provided. Details of one such joint are shown in FIG. 4. Two weld beads 6 are provided symmetrically with respect to the central axis through the T joint of rib 2 and outer wall 3. FIG. 6 shows the symmetrical bending deformation that occurs predominantly at joints in a vacuum vessel for a fusion device. In FIG. 6, M represents the moment that causes the asymmetrical deformation. The nominal bending stress $P_b$ occurring in the joint shown in FIG. 6 is expressed by:

$$P_b = \frac{6(2t_2)}{(2t_2)^3 - (2t_1)^3} \left( \int_{t_1}^{t_2} y\delta(y)dy + \int_{-t_2}^{-t_1} y\delta(y)dy \right)$$

If an asymmetric bend occurs, bending stresses as shown in FIG. 6 develop in the joint. On the other hand, if two weld beads are provided symmetrically with respect to the center line, the bending stress developing in the right bead is equal in magnitude but opposite in direction to the bending stress in the left bead; as a result, the nominal bending stress occurring in the joint can be cancelled.

If a bead width exceeding a weld width that can be obtained by one pass of electron beam welding is required, it should be secured by applying two or more passes of welding. If welding is done according to the scheme shown in FIG. 4, one bead line is fused only once with an electron beam and the desired welding can be accomplished without producing voids in the weldment.

In order to reduce the distortion in welding, heat should not get into any areas other than those to be welded. In MIG welding used to perform slot welding, the heat input is about 6,000 kJ/mm whereas only about 1,500 kJ/mm of heat is supplied to produce a joint by performing electron beam welding in accordance with the invention. Thus, the heat input can be reduced to a quarter of the heretofore required value, with the result that the distortion in welding is sufficiently reduced.

Figure 5:
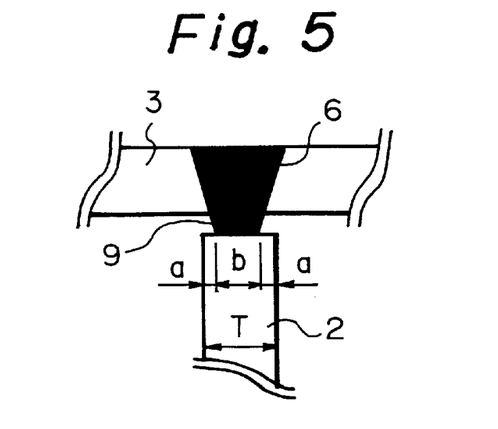
FIG. 5 is a cross-sectional view of slot-welded joint of the outer wall and each rib in a conventional double-wall structure.
Figure 7:
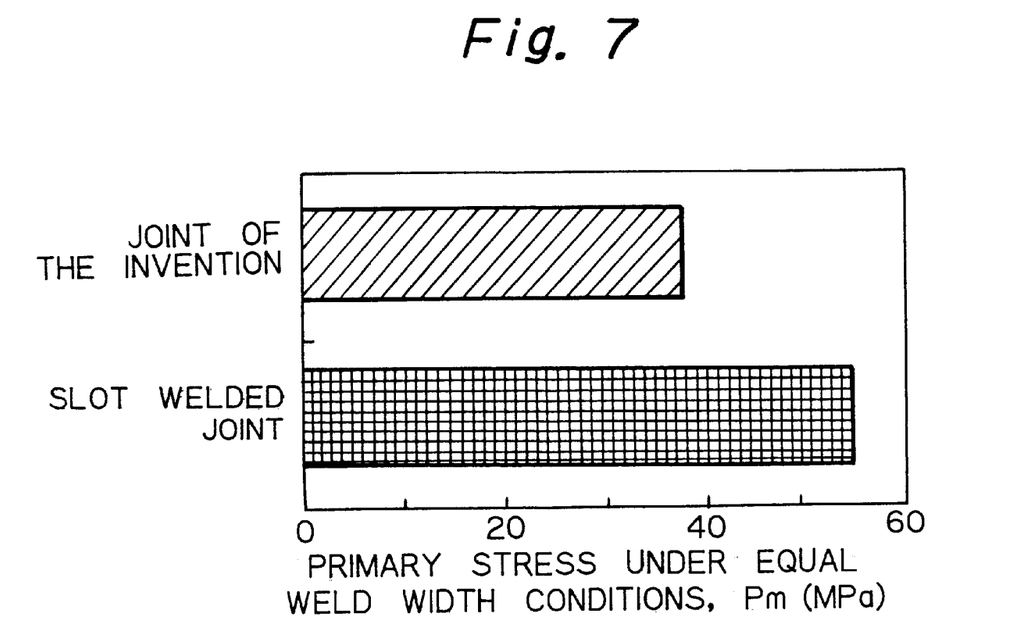
FIG. 7 is a characteristic diagram comparing the stress on a joint in the double-wall structure of the invention with that of primary stress on a slot-welded joint.
Figure 8:
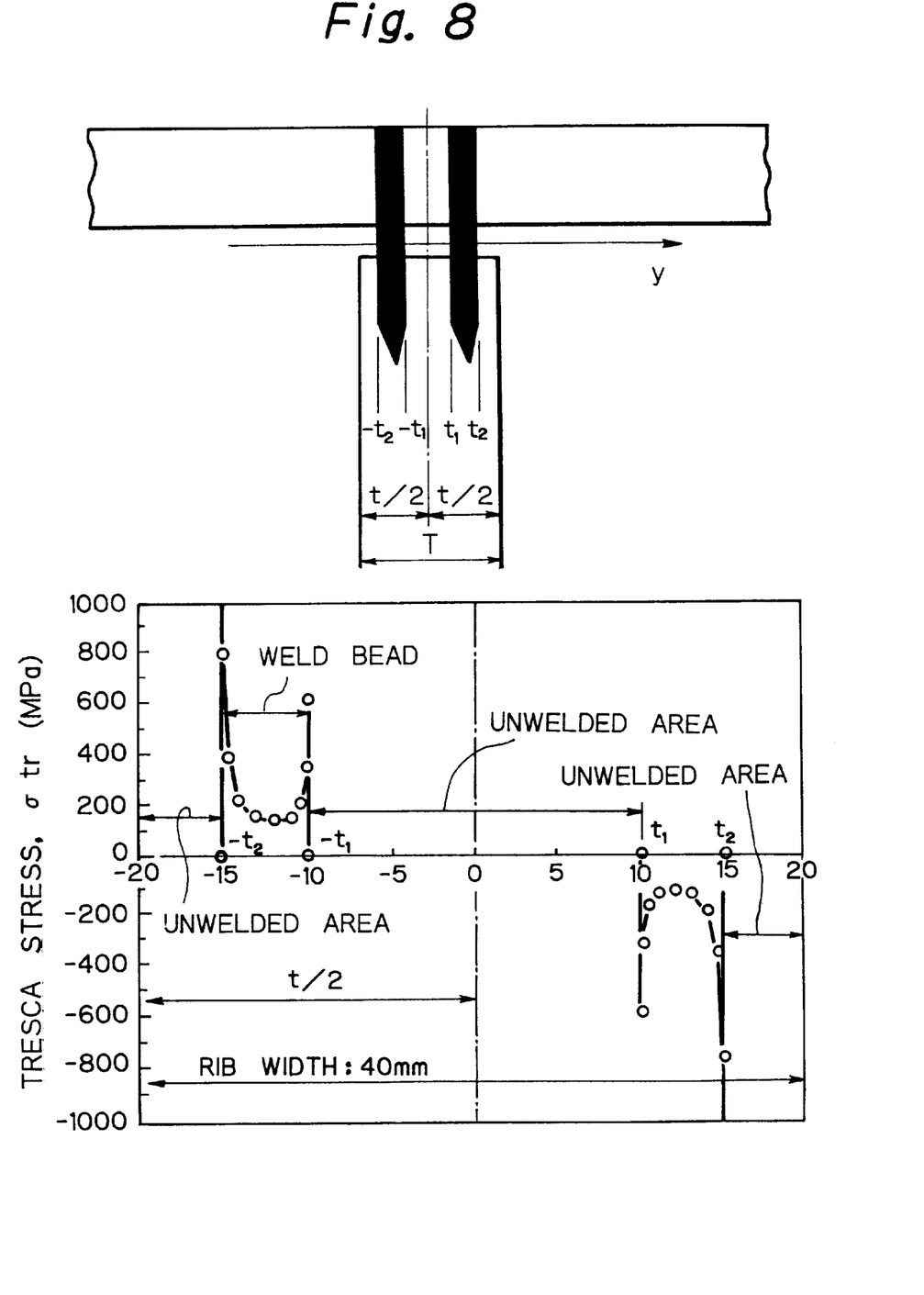
FIG. 8 is a characteristic diagram showing the distribution of stress on a joint in the double-wall structure of the invention.

FIG. 7 shows the strength of primary stress that occurs when a pressure builds up within a vacuum vessel that uses the joint structure produced by electron beam welding according to the invention (see FIG. 4), as compared with the strength of primary stress that develops in a vacuum vessel that uses the joint structure produced by slot welding (see FIG. 5). Primary stress strength measurements were conducted by stress analysis in accordance with a finite element method. The horizontal axis of the graph in FIG. 7 plots Pm/T, where Pm is the strength of primary stress developing in the joint and T is the thickness of a rib plate. The welded joint of the invention was produced using two beads each having a relative width (b/T) of 0.125 whereas the slot welded joint was produced using on bead with a relative width (b/T) of 0.25; however, the weld width relative to the rib thickness T was the same in the two joints. The value of a/T, or the relative length of the unwelded area exterior to each bead root in the joint of the invention, was 0.125 whereas in the slot welded joint, a/T was 0.375. Obviously, the joint structure of the invention can be produced by the same amount of welding and yet the strength of primary stress can be sufficiently reduced to provide higher joint reliability.

Figure 9:
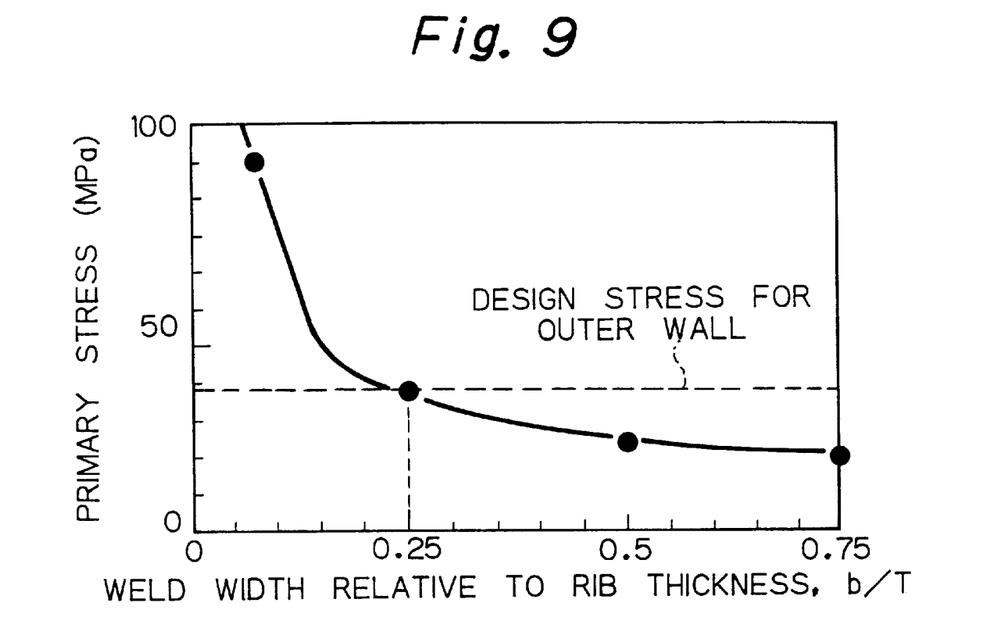
FIG. 9 is a characteristic diagram showing the stress as a function of the weld width relative to the thickness of the rib of each joint in the double-structure of the invention.

In order to prevent fracture from occurring at joints, their design stresses need be made comparable to the other parts of the vessel including the outer wall and the ribs. As FIG. 9 shows, if the sum of the widths of weld needs in the joint structure of the invention is at least 25% of the rib thickness, the strength of primary stress that will occur in the joint can be made smaller than the design stress for the outer wall, whereby fracture from the joint can be effectively prevented.

Figure 10:
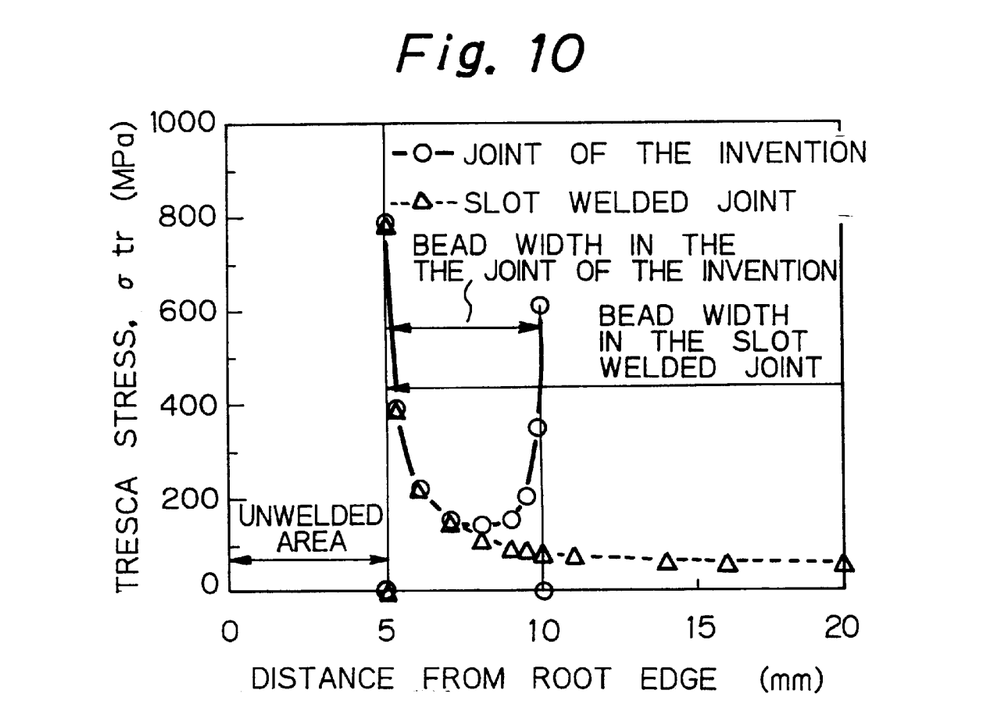
FIG. 10 is a characteristic diagram showing the distribution of stress near a bead root in the double-wall structure of the invention.

The vacuum vessel used in a fusion device is subject to repeated occurrence of a large electromagnetic force due to the plasma disruption and, hence, fatigue strength is another design factor that must be considered. The fatigue strength of the joint can be enhanced by increasing the distance between beads as shown in FIG. 4. Referring again to FIG. 6, bending moments M asymmetric to the rib occur in the joint under the influence of an external electromagnetic force. The resulting stress distribution near the root of a weld bead is shown in FIG. 10 for both the welded joint of the invention and the slot welded joint. For both types of weld, a/T is 0.125 but b/T is 0.125 for the joint of the invention and 0.75 for the slot welded joint, which differs from the joint of the invention in that welding is done not only along the two beads but also in the space therebetween. The vertical axis of the graph in FIG. 10 plots tresca stress and the horizontal axis plots the distance from the bead root. Obviously, the stress distribution in the joint of the invention is in substantial agreement with that in the slot welded joint and the stress concentration in the bead root is independent of the bead width. Therefore, the joint of the invention is in no way different from the slot welded joint in terms of fatigue characteristics and since it can be produced with a smaller amount of welding, the joint of the invention is more favorable for the purpose of reducing the distortion in welding and shortening the overall working time.

Figure 11:
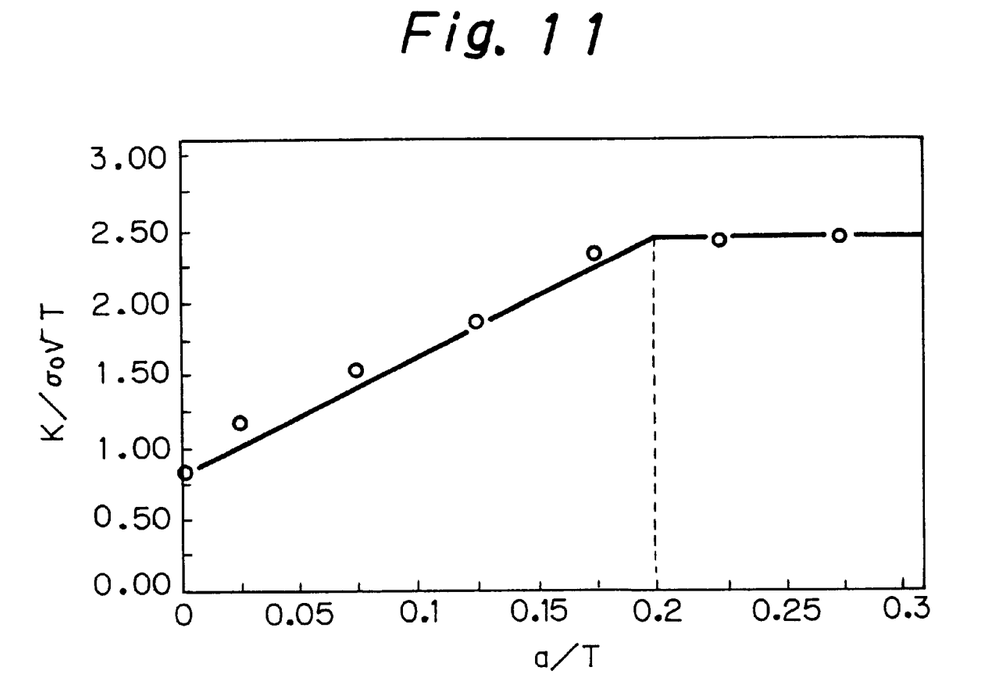
FIG. 11 is a characteristic diagram showing stress intensity factor as a function of the weld position for each joint in the double-wall structure of the invention.

FIG. 11 shows the stress intensity factor $K_{\theta max}/\delta\sqrt{T}$ as a function of a/T for the case where the joint of the invention is stressed as shown in FIG. 6. The value of $K_{\theta max}/\delta\sqrt{T}$ plotted on the vertical axis of the graph in FIG. 11 is dimensionless and refers to a maximum principal stress intensity factor, in which σ represents the bending stress. As one can see from FIG. 11, the smaller the distance between the welding point (a/T) and the surface of the rib, the smaller the value of $K_{\theta max}/\delta\sqrt{T}$ and, hence, better fatigue characteristics are assured. If a/T exceeds 0.2, $K_{\theta max}/\delta\sqrt{T}$ is substantially constant; therefore, better fatigue characteristics are achieved by adjusting a/T to 0.2 and below.

Figure 12:
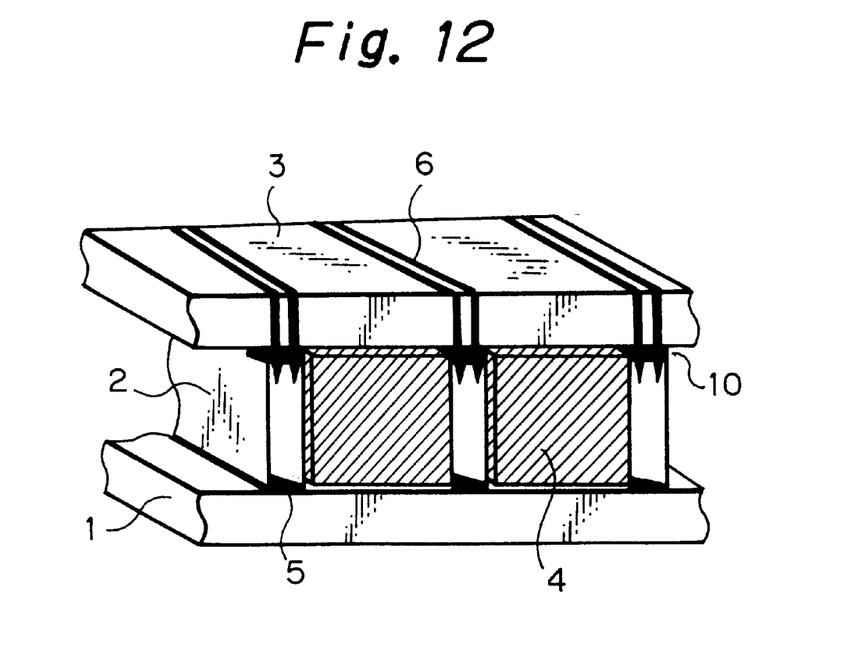
FIG. 12 is a partial perspective view showing the interior of a double-wall structure according to another embodiment of the invention.

FIG. 12 shows the interior of a double-wall structure for a vacuum vessel according to another embodiment of the invention. In this alternative case, wraparound welding is performed as indicated by 10 at both the start and end points of each joint produced by applying continuous electron beam welding along the rib. Since the ribs are subject to a strong force in the poloidal direction, the start and end points of electron beam welding which will be discontinuous areas are preferably reinforced by performing wraparound welding at the corresponding sites 10. Wraparound welding can be effected even after the shields are inserted and it contributes to a further improvement in the reliability of the joint of the invention.

According to the welding method of the invention, the distortion in welding can be sufficiently reduced to enable precise and efficient assembling of a double-wall structure that can reasonably withstand the large electromagnetic force caused by plasma disruption.

What is claimed is:

1. A piercing welding method for fabricating a double-wall structure having an inner wall, an outer wall surrounding said inner wall, and reinforcing ribs that connect said outer wall and said inner wall, the method comprising externally applying an electron beam at a right angle to the outer wall such that the applied electron beam penetrates the outer wall to reach an abutting rib, said abutting rib having a rib width, whereupon the outer wall is welded to the rib to form a welded structure having at least two piercing weld beads that are spaced apart by an unwelded area, wherein each of said at least two weld beads has a root and a weld bead width, wherein the sum of the widths of the at least two weld beads is at least 25% of the rib width, and wherein a length of the unwelded area exterior to the root of each bead is no more than 20% of the rib width.

2. The method according to claim 1, wherein the double-wall structure is the hull of ship, the fuselage of an airplane, a car body, a bridge structure, one of various containers in industrial plants, or a vacuum vessel.

3. The method according to claim 2, wherein the vacuum vessel is one for use in a nuclear fusion device.

4. The method according to claim 1, wherein shields are inserted between the outer and inner walls of the double-wall structure.

5. The method according to any one of claims 1–4, wherein wraparound welding is applied to the piercing welded end of each rib.

6. The method according to claim 1 further comprising welding the inner wall to the abutting rib by a welding technique selected from the group consisting of arc welding, electron beam welding, and laser beam welding.

* * * * *